United States Patent [19]

Nuttle

[11] Patent Number: 4,507,218

[45] Date of Patent: Mar. 26, 1985

[54] HEAT STORAGE MEANS

[76] Inventor: David A. Nuttle, 1316 Ravenhurst Dr., Raleigh, N.C.

[21] Appl. No.: 481,773

[22] Filed: Apr. 4, 1983

[51] Int. Cl.³ ............................................... C09K 5/00
[52] U.S. Cl. ........................................ 252/70; 252/62; 106/98; 501/124; 501/129
[58] Field of Search ............... 252/62, 70; 501/124, 501/129; 106/98

[56] References Cited

U.S. PATENT DOCUMENTS

| | | | |
|---|---|---|---|
| 2,077,793 | 4/1937 | Harvey et al. | 501/112 |
| 2,105,943 | 1/1938 | Goldschmidt | 501/112 |
| 2,128,404 | 8/1938 | Dunbeck | 501/129 |
| 2,861,636 | 11/1958 | Messenger | 501/129 |
| 4,277,357 | 7/1981 | Boardman | 252/70 |
| 4,303,448 | 12/1981 | Palmour et al. | 501/129 |

Primary Examiner—Paul Lieberman
Assistant Examiner—Robert A. Wax
Attorney, Agent, or Firm—Mills & Coats

[57] ABSTRACT

This invention is an improved heat storage means in the form of a high density masonry product for storing large amounts of heat in a relatively small area. This is accomplished through a special manufacturing process utilizing specific selected materials.

13 Claims, No Drawings

HEAT STORAGE MEANS

FIELD OF INVENTION

This invention relates to storage means and more particularly to means for storing heat for later use.

BACKGROUND OF INVENTION

Since man first began to heat and cool the enclosures within which he lives and works, there has been a problem in maintaining an even temperature.

When the enclosures or structures have been heated by means such as the burning of combustibles, whether in a fireplace, stove, or furnace, high heat is achieved during the burn with a dropping of temperature between firings.

Although the use of solar energy to at least supplement the heating of structures has been known and experimented for many years, it has only been since the fossil fuel shortages of the mid-1970's that this source of heat has been seriously considered.

In all solar systems, whether active or passive, the problem of storing the heat obtained during favorable times and conditions for later release and use during unfavorable times and/or conditions has been of primary concern.

Floor and wall tiles, bricks, cement blocks and the like have been used as heat storage means. Since these have almost universally proved to be inadequate, additional storage means such as liquid filled jugs and drums and similar means have been used to supplement and add to the storage capacity. The problem with these various means has been that, first they generally do not store the amount of heat necessary and secondly, they take up tremendous amounts of space which otherwise could be used as living or working areas.

BRIEF DESCRIPTION OF INVENTION

After much research and study into the above-mentioned problems, the present invention has been developed to provide a high density masonry product with improved heat storage capacity per unit volume. This masonry product is manufactured from economical metallic materials such as olivine sand to obtain more parallel alignment of molecules. The product is formed under high pressure and includes a dull dark color for greater heat absorption.

In view of the above, it is an object of the present invention to provide a high density masonry product with greatly improved heat storage capacity per unit volume.

Another object of the present invention is to provide an efficient and yet economical masonry product for passive solar and similar heat storage applications.

Another object of the present invention is to provide a masonry product composed of metallic sands and formed under high pressure to improve its heat storage capacity.

Another object of the present invention is to provide a masonry type product of dense structure for greater heat storage capacity.

Other objects and advantages of the present invention will become apparent from a study of the following description which is merely illustrative of the present invention.

DETAILED DESCRIPTION OF INVENTION

The masonry product of the present invention is preferably structured in the general form of a block or brick and has an ingredient composition by volume of 70% olivine or other sand having metallic properties, 20% neutral zeolite or similar clay having metallic properties, 8% portland cement, and 2% ironite or Iron Waterpeller which is a product sold by The Euclid Chemical Company of Cleveland, Ohio 44110.

The material commonly referred to as ironite is formed from pulverized cast iron which includes, by volume, between 85 and 95 percent iron (Fe), between 0.03 and 0.04 percent carbon (C) and between 0.01 and 0.02 percent silicone (Si). These particles are passed through a number 60 to number 90 sieve analysis screen and the particles are mixed with between 0.03 and 0.05 percent amonium chloride ($NH_4Cl$) to chemically oxidize such particles and to cause the iron to rust and grow. As mentioned above, ironite is manufactured and sold by Euclid Chemical Company of Cleveland, Ohio 44101 under the trade name "Iron Waterpeller".

A cement or similar type of mixer is used to mix the dry sand, clay, cement and ironite when added in the order and proportions giving above. The mixing continues for 10 to 15 minutes or until a uniform mix is obtained. Mixing is continued and water is added to achieve a 4 to 8% moisture content. To test the mix for appropriate moisture, the mix should form a soft ball-shape when squeezed in the hand.

To form the heat storage product of the present invention, the mixture is placed into a compacting means for forming into its final block form. Such a forming machine is sold under the trade name of Earth Ram manufactured by Earth Ram Sales, Inc., of Mesa, Ariz. This machine is capable of exerting between 225 and 250,000 pounds of pressure on the product during the forming process. This pressure will give the product density of 230 lbs/ft$^3$ or greater with a heat storage capacity of not less than 0.65 BTU/lb°F.

Once the heat storage product has been formed as described above, it is removed from the machine and cured in a shaded area protected from rain and direct water contact for a period of approximately eight days or, in the alternative, can be used immediately in masonry walls, floors or the like so long as the same can be shaded and protected against water contact for the eight-day period.

Through experimentation, the two following slightly different ingredient examples have been found to work adequately.

1. 65% metallic sand as specified, 25% metallic clay, 6% portland cement and 5% ironite.
2. 60% metallic sand as specified, 30% metallic clay, 5% portland cement and 5% ironite.

Again from extensive experimentation, it has been determined that the following ranges of ingredients can be used:

1. 60 to 70% metallic sand as specified, 20 to 30% metallic clay as specified, 5 to 8% cement as specified; and 2 to 5% ironite.

Although the above ingredient examples and ranges have been found to allow the product to be produced with the superior heat storage qualities enumerated, should the zeolite or similar clay having metallic properties not be readily available, then the portland cement can be increased to between 8 and 16% with adequate results being obtainable.

From the above it can be seen that the present invention has the advantage of providing a relatively simple heat storage product with tremendous capacity being achieved in a small volume. This is a great advantage for any heat storage application but particularly in passive solar uses since under normal conditions supplemental storage means is either greatly reduced or is not required.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:

1. An improved heat storage means in the general form of a block composed of, by volume; between 60 and 70% sand having metallic properties; between 20 and 30% clay having metallic properties; between 5 and 8% cement; and between 2 and 5% ironite.

2. The means of claim 1 wherein said sand is of the olivine type.

3. The means of claim 1 wherein said clay is of the neutral zeolite type.

4. The means of claim 1 wherein said cement is of the portland type.

5. The means of claim 1 wherein said sand is approximately 70%; said clay is approximately 20%; said cement is approximately 8%; and said ironite is approximately 2%.

6. The means of claim 1 wherein said sand is approximately 65%; said clay is approximately 25%; said cement is approximately 6%; and said ironite is approximately 4%.

7. The means of claim 1 wherein said sand is approximately 60%; said clay is approximately 30%; said cement is approximately 5%; and said ironite is approximately 5%.

8. The means of claim 1 wherein between 8 and 16% cement is substituted for said clay.

9. The means of claim 8 wherein said substitute cement is of the portland type.

10. The method of preparing a heat storage means comprising: mixing, by volume, between 60 and 70% sand having metallic properties, between 20 and 30% clay having metallic properties, between 5 and 8% cement, and between 2 and 5% ironite until a uniform mixture is obtained; adding water to the mixture to achieve between 4 and 8% moisture in the mix; and compacting said mix under approximately 225,000 psi to form a block-like structure of high heat storage capacity.

11. The method of claim 10 wherein said sand is of the olivine type.

12. The method of claim 10 wherein said clay is of the neutral zeolite type.

13. The method of claim 10 wherein said cement is of the portland type.

* * * * *